(12) United States Patent
Heino (10) Patent No.: US 9,637,176 B2
(45) Date of Patent: May 2, 2017

(54) FASTENING SUPPORT FOR MUDGUARD AND MUDGUARD ARRANGEMENT

(71) Applicant: MOTOSEAL COMPONENTS OY, Rauma (FI)

(72) Inventor: Jussi Heino, Rauma (FI)

(73) Assignee: MOTOSEAL COMPONENTS OY, Rauma (FI)

( * ) Notice: Subject to any disclaimer, the term of this patent is extended or adjusted under 35 U.S.C. 154(b) by 0 days.

(21) Appl. No.: 14/596,004

(22) Filed: Jan. 13, 2015

(65) Prior Publication Data

US 2015/0197287 A1   Jul. 16, 2015

(30) Foreign Application Priority Data

Jan. 14, 2014 (FI) .................................... 20145023

(51) Int. Cl.
*B62D 25/16* (2006.01)
*B62D 25/18* (2006.01)

(52) U.S. Cl.
CPC ......... *B62D 25/163* (2013.01); *B62D 25/168* (2013.01); *B62D 25/182* (2013.01); *B62D 25/186* (2013.01)

(58) Field of Classification Search
CPC .... B62D 25/18; B62D 25/182; B62D 25/184; B62D 25/186; B62D 25/166; B62D 25/163; B62D 25/168

(Continued)

(56) References Cited

U.S. PATENT DOCUMENTS 5,074,573 A    12/1991  Dick
5,794,956 A *   8/1998  Hurlburt .............. B62D 25/186
                                                   280/156

(Continued)

FOREIGN PATENT DOCUMENTS

DE    36 07 000 A1    9/1987
EP    1 043 217 A1   10/2000

(Continued)

*Primary Examiner* — Frank Vanaman
(74) *Attorney, Agent, or Firm* — Birch, Stewart, Kolasch & Birch, LLP (57) ABSTRACT

A mudguard fastening support is intended to connect the mudguard to a hub of a turning wheel. In a normal turning position, the mudguard turns with the wheel. The mudguard fastening support has a flexible structure in such a manner that a stop element prevents the mudguard from turning along with the wheel at an angle that is larger than a specific turning angle. With the flexible structure the mudguard is returned to turn with the wheel at an angle that is smaller than said specific turning angle. The mudguard fastening support has a turning sleeve to be fixed to the mudguard and a support element to be fixed to the hub of the wheel. The turning sleeve and support element have form surfaces facing each other, one of which forms a support surface and the other forms a mating surface. The support surface has a tip part with a rounded peak toward the mating surface. The mating surface has an operating position recess which is furthest away from the support surface and to which in a normal operating situation the tip part is to be arranged, and adjacent to the operating position recess, a bevelled surface.

19 Claims, 6 Drawing Sheets

(58) Field of Classification Search
USPC ..... 280/156, 157, 152.05, 159, 847; 293/12, 293/13
See application file for complete search history.

(56) References Cited

U.S. PATENT DOCUMENTS

| | | | |
|---|---|---|---|
| 8,388,003 B2 | 3/2013 | Wellman et al. | |
| 2008/0185810 A1* | 8/2008 | Archer | B62D 25/188 280/154 |
| 2013/0154228 A1 | 6/2013 | Ducroquet | |
| 2013/0313389 A1* | 11/2013 | Lodi | B62D 25/166 248/214 |

FOREIGN PATENT DOCUMENTS

| | | |
|---|---|---|
| EP | 1 481 880 A1 | 12/2004 |
| EP | 2 666 702 A1 | 11/2013 |
| FI | 111615 B | 8/2003 |
| FI | 115762 B | 7/2005 |
| FR | 2 813 847 A1 | 3/2002 |

\* cited by examiner

FASTENING SUPPORT FOR MUDGUARD AND MUDGUARD ARRANGEMENT

BACKGROUND OF THE INVENTION

The invention relates to a fastening support for a mudguard and to a mudguard arrangement.

Solutions are known, in which the mudguard is fastened to the hub of a wheel in such a manner that as the wheel turns at a small turning angle, the mudguard turns with it, and a stop element is arranged in the support structures of the mudguard to prevent the mudguard from turning at turning angles larger than a specific turning angle. The mudguard is fastened to the hub of the wheel with a fastening support having a flexible structure to ensure that the mudguard does not turn at large turning angles of the wheel. Further, this flexible structure returns the mudguard to the direction of the wheel, when the turning angle of the wheel is rectified. Solutions of this type are presented in publications U.S. Pat. No. 5,074,573, FR 2813847, EP 1481880, DE 3607000, and EP 1043217, for example.

BRIEF DESCRIPTION OF THE INVENTION

It is an object of the present invention to provide a new type of fastening support for a mudguard, and a mudguard arrangement.

The fastening support according to the invention is characterised by what is disclosed in the independent claims. Some embodiments of the invention are disclosed in the dependent claims.

In the present solution, the mudguard fastening support has a flexible structure, a stop element preventing the mudguard from turning along with the wheel at an angle that is larger than a specific turning angle, and with the flexible structure the mudguard is returned to turn with the wheel at an angle that is smaller than said specific turning angle. The mudguard fastening support has a turning sleeve to be fixed to the mudguard and a turning support element to be fixed to the hub of the wheel. The turning sleeve and support element have form surfaces facing each other, one of which forms a support surface and the other forms a mating surface. The support surface has a tip part with a rounded peak toward the mating surface. The mating surface has an operating position recess which is furthest away from the support surface and to which in a normal operating situation the tip part is to be arranged, and beside the operating position recess, a bevelled surface. The form surfaces facing each other then form a wedge element, which makes the structure of the fastening support simple and it is possible to avoid loose pieces between the turning sleeve and support element, for example. Further, because the tip part peak is rounded, it is possible in a simple manner to avoid point contact even in a situation, where the tip part is against the bevelled surface. All in all, the movement of the tip part and turning sleeve in relation to each other can be made smooth.

According to an embodiment, the bevelled surface has a specific mean wedge angle and the operating position recess has at a point adjacent to the bevelled surface a wedge angle larger than said mean wedge angle. In a normal turning position, the tip part then remains firmly in the operating position recess and the mudguard clicks firmly into the normal turning position as it again turns with the wheel.

According to a second embodiment, the shape of the operating position recess corresponds to that of the tip part peak. Then, when the tip part is in the operating position recess, there is a support surface between the turning sleeve and support element, and point-form or linear loads can be avoided in a normal turning situation.

According to yet another embodiment, the mating surface has, after the bevelled surfaces, maintenance position recesses in the part of the mating surface that is closest to the support surface. The mudguard can then be turned manually, for instance, to the maintenance position to permit maintenance of the vehicle to take place between the mudguard and body of the vehicle, for example. In this embodiment, in particular, it is advantageous to have a rounded tip part peak, whereby the tip part peak does not cause wear or other damage to the mating surface as the mudguard is turned to the maintenance position.

BRIEF DESCRIPTION OF THE FIGURES

The invention will be described in greater detail in the attached drawings, in which.

For the sake of clarity, the figures show some embodiments of the invention in a simplified manner. In the figures, like reference numerals identify like elements.

DETAILED DESCRIPTION OF THE INVENTION

Figure 1:
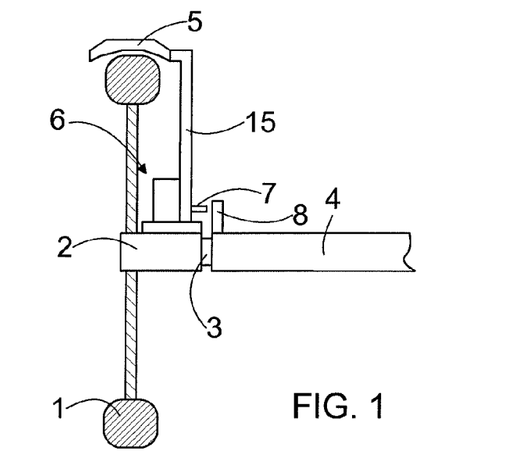
FIG. 1 is a schematic view of a mudguard fastening support mounted to a wheel in the direction of travel of the vehicle and with the wheel in cross-section.

FIG. 1 shows a wheel 1 that is fitted with bearings to rotate around a hub 2. The hub 2 is connected by a joint 3 to a stationary axle 4, whereby the hub 2 and thus also the wheel 1 is able to turn in relation to the axle 4.

Figure 2A:
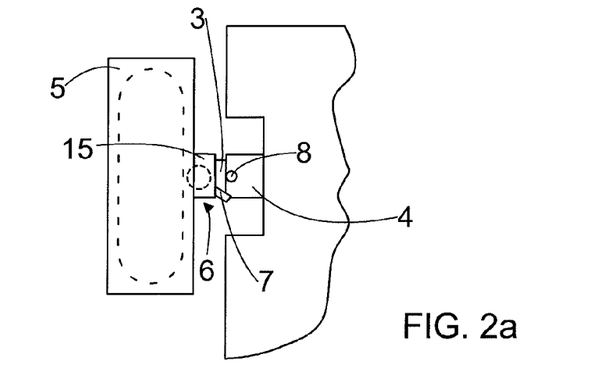
FIGS. 2a, 2b and 2c are schematic top views of a mudguard mounted to a wheel and with the wheel turned in different positions.

To the wheel 1, a mudguard 5 is arranged and connected to the hub 2 via a fastening plate 15 and fastening support 6 of the mudguard. In a normal situation, the mudguard 5 then turns as the wheel 1 turns. FIG. 2a shows a situation, when driving straight forward, and FIG. 2b shows a situation, in which the wheel 1 has been turned and the mudguard 5 has turned with the wheel.

The fastening support 6 of the mudguard has a flexible structure. A stop pin 7 or some other suitable stop element is arranged to the mudguard fastening support 6. The stop pin 7 can be arranged to the mudguard fastening plate 15, for instance, which in turn is fastened to the mudguard fastening support 6. When the wheel 1 is turned at an angle larger than a specific angle, the stop pin 7 contacts a fixed structure, such as a pin 8, in the vehicle. This contact takes place when the wheel is turned as extensively as shown in FIG. 2b. As the wheel 1 is turned even more, as shown in FIG. 2c, the stop pin 7 prevents the turning of the mudguard 5. The flexible structure of the mudguard fastening support 6 then yields and the mudguard 5 does not contact the body of the vehicle 9. The vehicle 9 may be an agricultural tractor or a garden tractor or a light gardening machine or some other vehicle equipped with turning wheels. When the mudguard 5 does not turn at a large turning angle with the wheel 1, damage to the vehicle 9 is prevented. A part of the vehicle, such as the side panel of a tractor, might be damaged if a mudguard hits it. Similarly, damage to the mudguard is also avoided.

The stop element that prevents the mudguard 5 from turning with the wheel 1 at a turning angle larger than a specific angle can also be formed by means of a vehicle 9 part and mudguard 5. In such a case, the mudguard 5 is allowed to contact the body of the vehicle 9, i.e. the body of the vehicle 9 serves as the stop element, and as the mudguard 5 contacts the body of the vehicle 9 and as the wheel turns further, the flexible structure of the mudguard fastening element 6 yields. This type of stop element solution naturally requires that the mudguard 5 be sufficiently durable and strong. Further, the body of the vehicle 9 must be made strong enough at the location that the mudguard 5 contacts. For instance, the side mirror of the tractor can be strengthened by a piece of plastic. The flexible structure and rigidity of the mudguard fastening support 6 are made to prevent damage to the mudguard 5 and body of the vehicle 9.

Figure 2B:
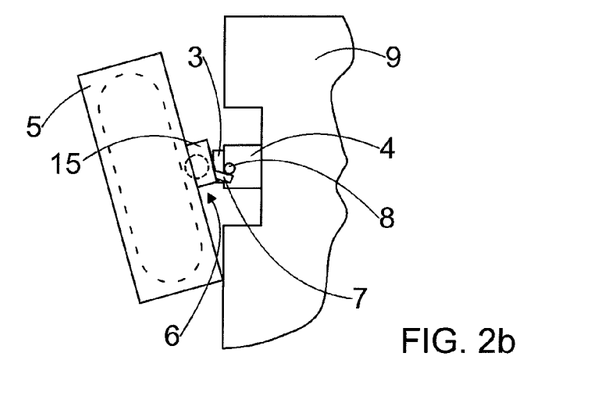
Figure 2C:
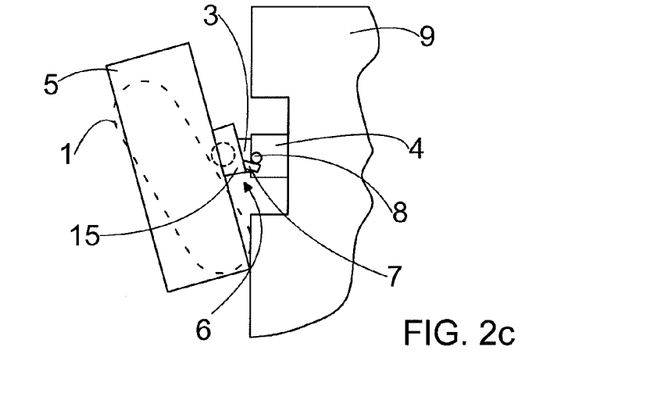

With the flexible structure of the mudguard fastening support 6, the mudguard 5 is returned to turn with the wheel 1 when the turning angle of the wheel 1 is again as shown in FIG. 2b or smaller.

Figure 3:
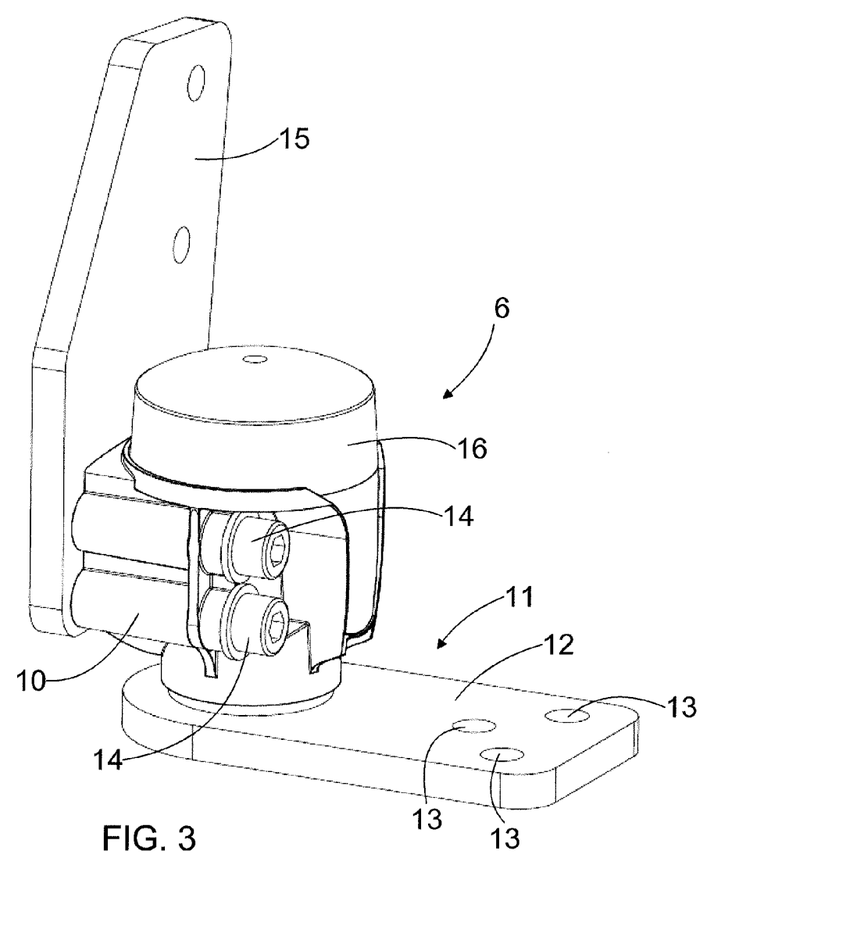
FIG. 3 shows a mudguard fastening support mounted to a fastening plate of a mudguard.

FIG. 3 shows a mudguard fastening support 6 having a turning sleeve 10 and support element 11. The support element 11 has a support plate 12, from which the mudguard fastening support 6 is fixed to the hub of a wheel. The fastening can be done by bolts arranged through holes 13, for example.

The turning sleeve 10 is fixed with fastening bolts 14, for instance, to the fastening plate 15 of the mudguard. The mudguard 5 is in turn fastened to the fastening plate 15 of the mudguard. Between the mudguard fastening plate 15 and mudguard 5, there may be arms or fastening plates or other means, with which the position of the mudguard 5 can be adjusted in the height and horizontal positions.

FIG. 3 further shows a protective cap 16. The protective cap 16 protects the structure of the mudguard fastening support 6 against the environment.

Figure 4:
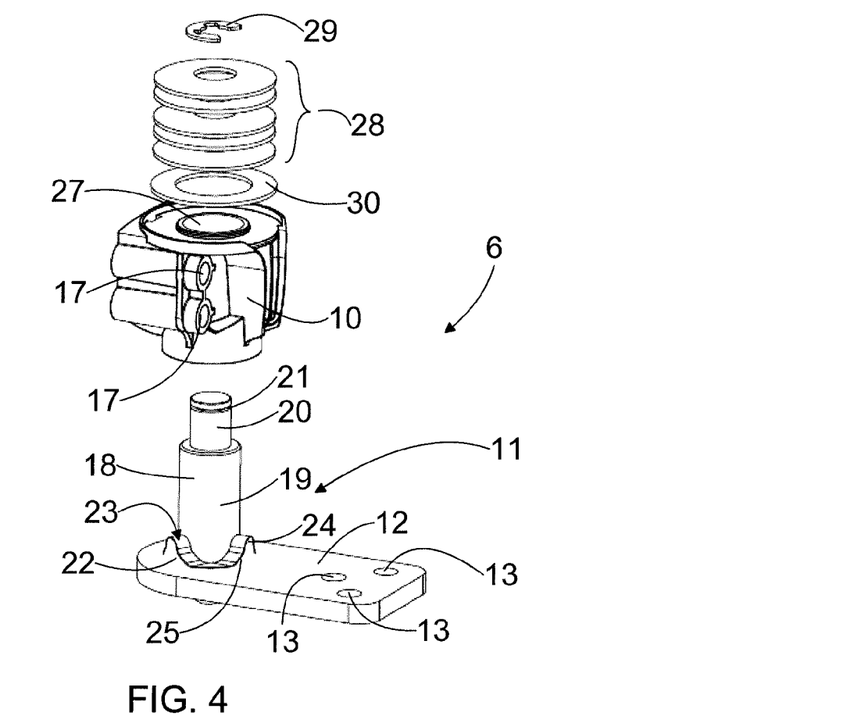
FIG. 4 is an exploded view of the mudguard fastening support shown in FIG. 3.

FIG. 4 shows an exploded view of the mudguard fastening support 6. For the sake of clarity, FIG. 4 does not show the protective cap 16. Further, FIG. 4 does not show any fastening bolts 14, which means that FIG. 4 shows the holes 17 for the fastening bolts 14.

The support element 11 further has a support pin 18 extending upward from the support plate 12. The bottom part 19 of the support pin 18 has a larger diameter than the top part 20 of the support pin 18. The bottom part 19 and the top part 20 of the support pin are cylindrical. Because the bottom part 19 of the support pin has a larger diameter than the top part 20 of the support pin, a shoulder is formed on the top end of the bottom part 19 of the support pin. The top end of the top part 20 of the support pin has a groove 21.

At the bottom of the bottom part 19 of the support pin 18, the support element 11 has a base 22. The top surface of the base 22 forms a support surface 23. This way, the support element 11 has a support surface 23 formed toward the turning sleeve 10. The support surface 23 has tip parts 24 with rounded peaks.

The base 22 has a support wall 25 on both sides of the tip part 24 peak. This way, the tip part 24 can be made strong. Thus, the support surface 23 is formed by the base 22 that extends upward from the support plate 12 along the side of the bottom part 19 of the support pin 18.

The support plate 12, support pin 18 and base 22 form a uniform structure. This uniform structure can be formed in such a manner, for example, that the base 22 and support pin 18 are attached by a thermal fit and welded to the plate 12. It is then possible to form different support elements 11 for different vehicle structures in such a manner that the support plates 12 in the different support elements 11 differ from each other, but the support pin 18 and base 22 of the different support elements 11 are similar. This way, the manufacturing of the mudguard fastening support can be simplified and it is still possible to provide many different structures with different measurements for various purposes. When the support pin 18 and base 22 are similar in different embodiments, the embodiments may also have similar turning sleeves 10 and structures related to the turning sleeve 10. The support plate 12, support pin 18, and base 22 may also be made into a uniform structure in such a manner, for example, that they are cast as a uniform piece. The support element 11 may be made of steel, for instance. Further, if desired, the support element 11 can be made of some other material, such as plastic, of fibre-reinforced polyamide PA, for example.

The turning sleeve 10 is arranged on top of the support pin 18. The inner surface 26 of the turning sleeve 10 is cylindrical and arranged against the bottom part 19 of the support pin 18. The inner diameter of the inner surface 26 of the turning sleeve 10 corresponds to the outer diameter of the bottom part 19 of the support pin 18. This diameter may be in the range of 15 to 200 mm, for example.

The inner surface 26 of the turning sleeve 10 may be made of a plastic material, for example. It is then possible to form a bearing surface between the bottom part 19 of the support pin 18 and the inner surface 26 of the turning sleeve 10. This way, it is possible to avoid the use of a lubricant between the turning sleeve 10 and support pin 18.

The inner surface 26 of the turning sleeve 10 may be made of polyacetal POM, for example. It is then possible to form a well working bearing surface between the support pin 18 made of steel, for instance, and the turning sleeve 10. The turning sleeve 10 can be essentially entirely made of polyacetal POM. It is also possible to make the turning sleeve 10 mainly of some other plastic material than polyacetal POM and arrange to the turning sleeve 10 a bearing insert made of a suitable plastic material to form the inner surface 26 of the turning sleeve 10. This bearing insert may be made of polyacetal POM or, more preferably, of an even harder and more slippery plastic material, such as polytetrafluoroethylene PTFE.

The fact that the turning sleeve 10 is made essentially entirely of plastic also comprises an embodiment, in which the structure of the turning sleeve 10 has less than 20% of other material than plastic, for instance. In such a solution, metal threaded inserts, for instance, may be arranged in the holes 17.

As shown in the attached figures, the turning sleeve 10 can be made structurally to have ribs and recesses. In this type of structure, the generation of tension during injection-moulding is avoided.

The cylindrical inner surface 26 of the turning sleeve 10 can be made by scraping or otherwise machining. The turning sleeve 10 can then be made by moulding without a contracting core. This way, the manufacturing of the turning sleeve 10 can be made cost-efficient. Furthermore, the forming of a cylindrical inner surface 26 by scraping is preferable in terms of manufacturing precision.

When the turning sleeve 10 is arranged on top of the support pin 18, the top part 20 of the support pin 18 enters through a hole 27 in the top part of the turning sleeve 10. The turning sleeve 10 is arranged to remain stationary on top of the support pin 18 by means of a spring element, such as a spring 28. The spring 28 may be a cup spring, wherein the spring is formed of disciform elements that are against each other. The spring 28 is locked in place at its top end with a locking washer 29. The locking washer 29 is arranged to the groove 21 at the top end of the top part 20 of the support pin 18.

A washer 30 may be arranged between the spring 28 and the top surface of the turning sleeve 10. This way, the washer 30 protects the structure of the turning sleeve 10 against wear. Instead of a cup spring, the spring 28 may also be a coil spring or some other corresponding spring or spring structure. Instead of the spring, a structure made of a flexible material, for example, can also be used as the spring element.

When the top part 20 of the support pin is smaller than its bottom part 19, the hole in the middle of the cup spring disc may be relatively small. Further, at the same time, the bottom part 19 of the support pin settling against the inner surface 26 of the turning sleeve 10 can be relatively large in diameter, whereby the structure becomes quite strong as a whole.

Figure 5:
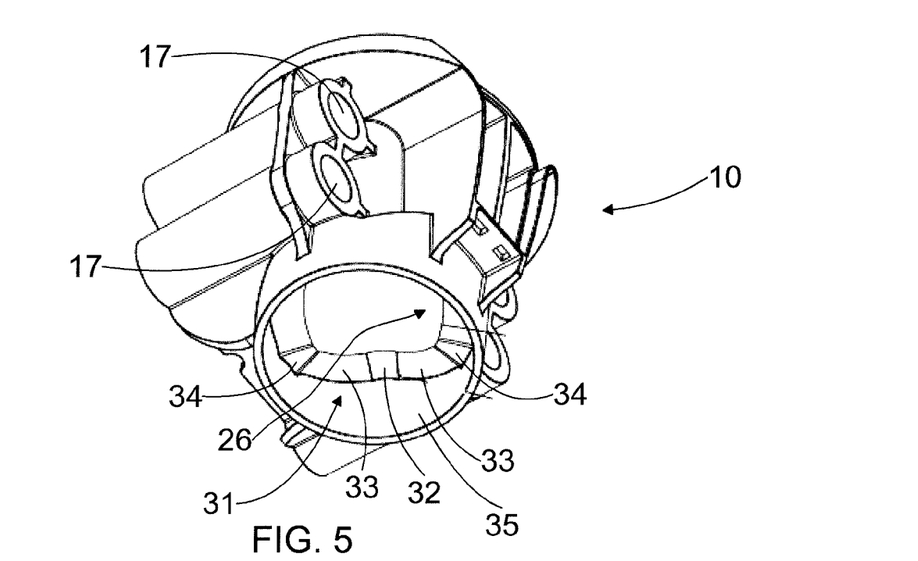
FIG. 5 shows a turning sleeve of the mudguard fastening support shown in FIG. 4 as seen obliquely from below.

The turning sleeve 10 has in the manner illustrated in FIG. 5, for example, a mating surface 31 against the support surface 23. The mating surface 31 has operating position recesses 32. The operating position recesses 32 are in the mating surface 31 formed highest, i.e. furthermost, as seen from the support plate 12. In a normal turning situation, i.e. in a situation where the wheel turns at a turning angle that is smaller than a specific turning angle, the tip part 24 of the support surface 23 is arranged in the operating position recess 32. Even though in a normal turning situation of the wheel, the peak of the tip part 24 of the support surface 23 is against the operating position recess 32 of the mating surface 31, the shape of the mating surface 31 can be described in such a manner that the operating position recesses 32 are furthest away from the support surface 23.

There are bevelled surfaces 33 on both sides of the operating position recess 32. The bevelled surfaces 33 end up in the maintenance position recesses 34. The maintenance position recesses 34 are in the part of the mating surface 31 that is closest to the support plate 12 and thus also the support surface 23.

The form surfaces facing each other, i.e. the mating surface 31 and support surface 23, of the turning element 10 and support element 11 form a wedge element.

In a normal turning situation, i.e. in a situation where the wheel turns at a turning angle that is smaller than a specific turning angle, the tip parts 24 of the support surface 23 are arranged in the operating position recesses 32. When the stop pin 7 prevents the turning sleeve 10 from turning as the wheel is turned, the support pin 18 still continues to turn. The tip part 24 then turns away from the operating position recess 32 and is, after that, against the bevelled surface 33. The wedge element then lifts the turning sleeve 10 upward. As the wheel is turned back toward a smaller turning angle, the wedge part together with the weight of the turning sleeve 10 and the related structures as well as the effect of the spring 28 returns the turning sleeve to the position, in which the tip parts 24 are in the operating position recesses 32. The bevelled surfaces 33 are made so long that the wedge part returns the tip parts 24 to the operating position recesses 32 even at the maximum turning angle of the wheel.

If required, the mudguard may be turned to the maintenance position in relation to the support plate 12. The mudguard and thus also the turning sleeve 10 are then turned manually, for instance, in such a manner that the operating position recesses 32 are turned away from the tip parts 24 and the turning sleeve 10 is turned onward so that the maintenance position recesses 34 settle on top of the tip parts 24. The mudguard is then in its maintenance position, which means that the mudguard is turned away from the vehicle body so as to allow maintenance work to be done between the mudguard and vehicle body, for example.

The turning sleeve 10 also has a flange 35. The flange 35 extends closer to the support plate 12 than the mating surface 31. When the turning sleeve 10 is arranged on top of the support pin 18, the flange 35 also extends around the structures forming the support surface 23. This way, the flange 35 can be made to protect the mating surface 31 and support surface 23 that are against each other.

The flange 35 can be made by machining, for example, like the cylindrical inner surface 26 of the turning sleeve 10. The flange 35 can also be formed by using a mould.

Figure 12A:
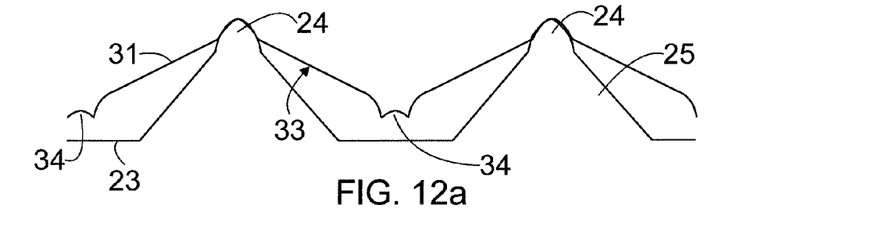
Figure 12B:
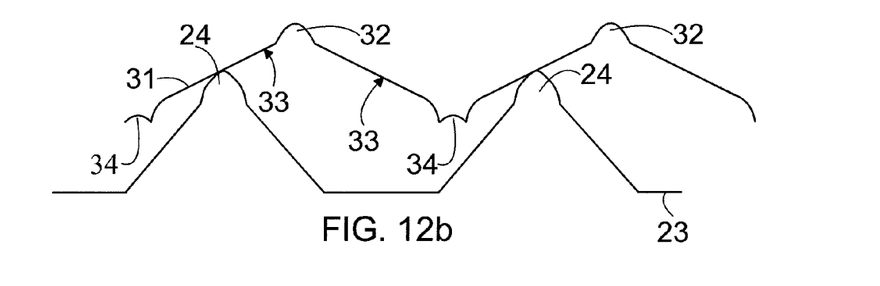
Figure 12C:
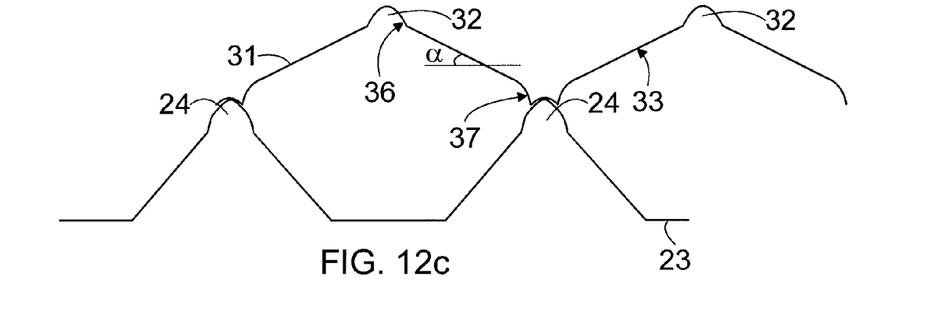

FIGS. 12a, 12b, and 12c illustrate the mating surface 31 and support surface 23 in planar representation. In FIG. 12a the wheel is in its normal turning position, i.e. at a turning angle smaller than a specific turning angle. In FIG. 12b, the wheel is shown at a turning angle larger than a specific turning angle, at which the mudguard and thus also the turning sleeve 10 is not allowed to turn as far as the wheel. In FIG. 12c, the mudguard is in its maintenance position.

The support surface 23 is formed in such a manner that in all operating situations, only the tip part 24 or the peak of the tip part 24 touches the mating surface 31. The shape of the tip part 24 peak, however, corresponds to the shape of the operating position recess 32 of the mating surface. Therefore, when the tip part 24 is in the operating position recess 32, there is a support surface between the turning sleeve 10 and support element 11. This way, it is possible to avoid point-form or linear loads in a normal turning situation. Similarly, the shape of the maintenance position recess 34 corresponds to that of the tip part 24 peak. Thus, also in the maintenance position, there is a support surface between the turning sleeve 10 and support element 11, whereby it is possible to avoid point-form and linear loads even in this case.

Figure 6:
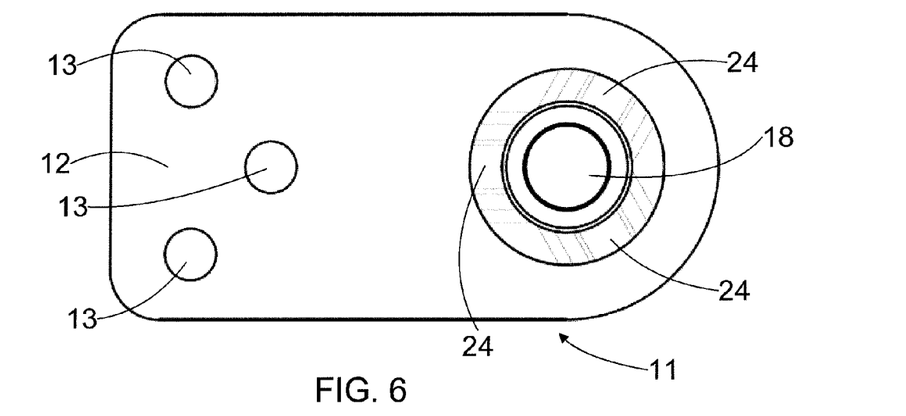
FIG. 6 shows a support element from the top.
Figure 7:
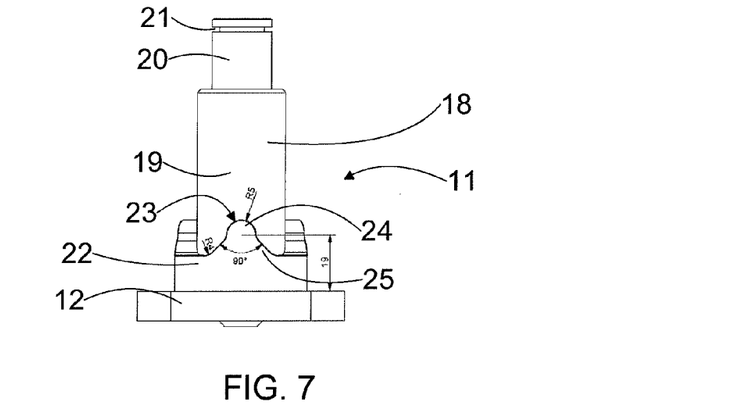
FIG. 7 is a front view of the support element according to FIG. 6.
Figure 8:
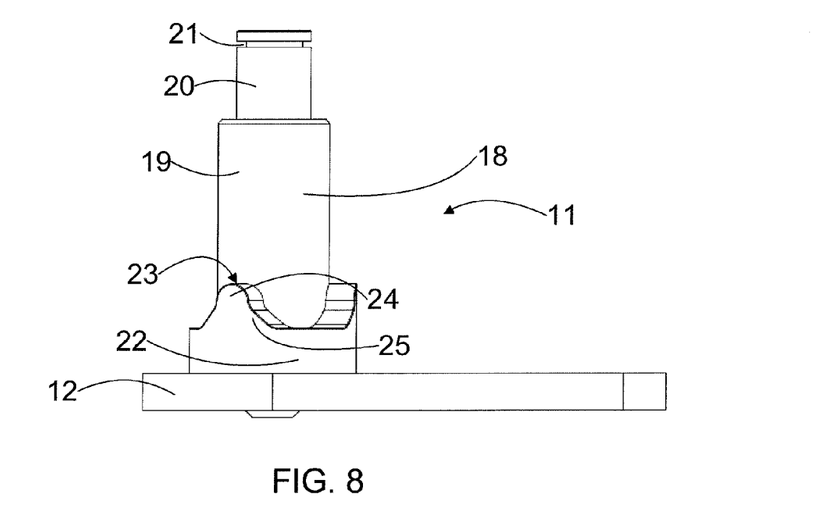
FIG. 8 shows the support element according to FIG. 6 as seen obliquely from the front.
Figure 9:
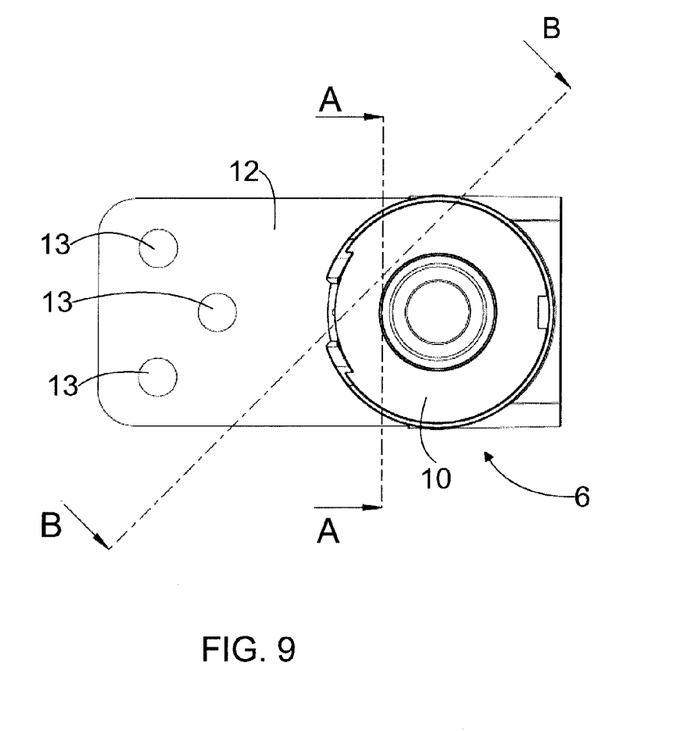
FIG. 9 is a top view of the mudguard fastening support according to FIG. 4.
Figure 10:
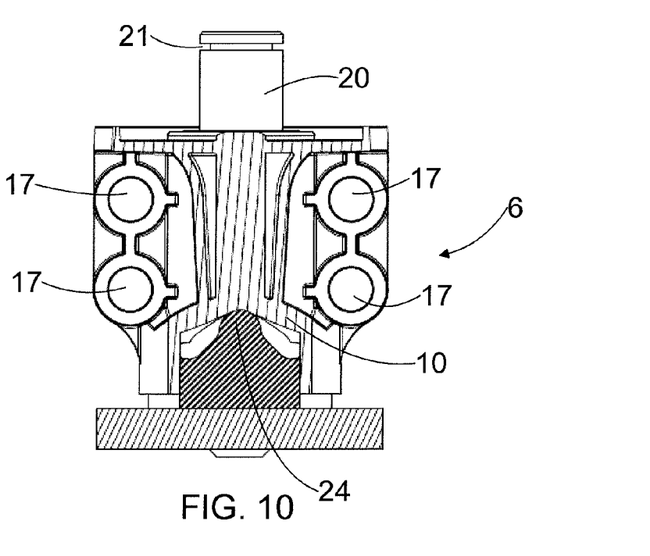
FIG. 10 shows the mudguard fastening support according to FIG. 9 cut along line A-A of FIG. 9.
Figure 11:
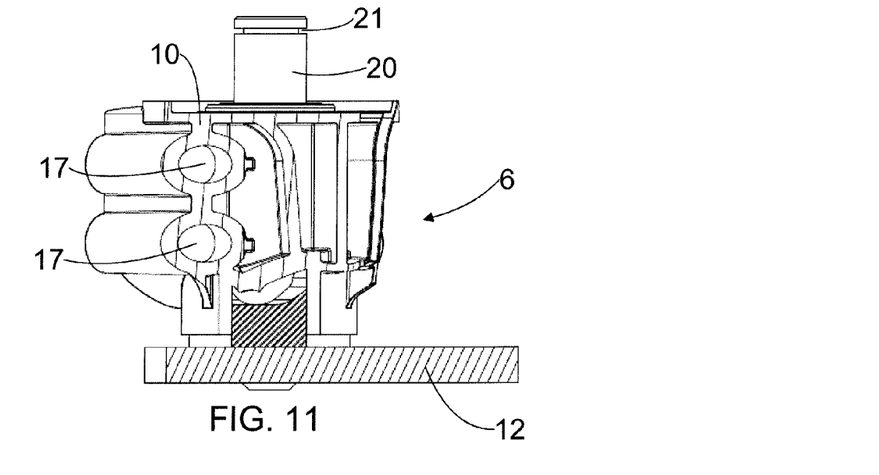
FIG. 11 shows the mudguard fastening support according to FIG. 9 cut along line B-B of FIG. 9, and FIGS. 12a, 12b and 12c illustrate the form surfaces of a turning sleeve and support element against each other with the mudguard and wheel turned into different positions with respect to each other.

As illustrated in FIGS. 6, 7, and 8, for instance, according to an embodiment, the peak of the tip part 24 is a surface that is formed by adjacent straight lines that form part of a cylindrical surface. An imaginary extension of this topmost straight line of the cylindrical surface runs through the centre axis of the support pin 18 of the support element 11. This type of structure is relatively simple to form. In this embodiment, the shapes of the operating position recesses 32 and maintenance position recesses 34 are correspondingly surfaces that are made up of adjacent straight lines that form part of the cylindrical surface. The imaginary extensions of the topmost straight lines intersect on the centre axis of the turning sleeve 10. When the turning sleeve 10 is on the support pin 18, they have a common centre axis. In such a structure, the contact surfaces between the tip part 24 peak and the operating position recess 32 and maintenance position recess 34, respectively, can be formed in such a manner that the contact surface area close to said centre axis is quite large.

Further, since the tip part 24 peak is formed of straight lines, it is possible to form in a simple manner a linear contact between the support surface 23 and mating surface 31, in the case shown in FIG. 12b, for instance, in which the wheel has turned past a specific turning angle.

The bevelled surface 33 has a specific mean wedge angle, which in FIGS. 12a to 12c is marked by ($\alpha$). The operating position recess 32 shows adjacent to its bevelled surface 33 a wedge angle larger than said mean wedge angle ($\alpha$) in the manner illustrated by reference marking 36. In the normal turning position, the tip part 24 then remains firmly in the operating position recess 32. When the tip part 24 returns to the operating position recess 32, the mudguard snaps firmly in the place of the normal turning position. Further, the mudguard does not easily exit the normal turning position.

At the maintenance position recess 34 end, the bevelled surface 31 has a wedge angle that is larger than said mean wedge angle ($\alpha$). This point in FIGS. 12a to 12c is illustrated by reference marking 37. This way, when the mudguard is turned into the maintenance position, a strengthening of the turning resistance is detected just before the maintenance position is reached. A clear resistance is thus received in reaching the maintenance position location and the turning into the maintenance position can be made in a controlled manner. The mudguard thus does not turn into the maintenance position by mistake or the mudguard cannot easily be turned beyond the maintenance position location by accident.

Rounding the tip part 24 peak is in an embodiment made in such a manner that the radius of curvature of the peak is more than 2 mm. In another embodiment, the radius of curvature of the peak is more than 4 mm. According to an embodiment, the radius of curvature varies in the range of 3 to 50 mm. According to an embodiment, the radius of curvature of the operating position recess 32 is equal to that of the tip part 24 peak of the support surface. According to yet another embodiment, the radius of curvature of the maintenance position recess 34 is equal to that of the tip part 24 peak of the support surface.

In the embodiment shown in the figures, the support surface is a form surface of the support element and the mating surface is a form surface of the turning sleeve. The structure can also be formed the other way round, i.e. the form surface of the support element may form the mating surface and the form surface of the sleeve may form the support surface.

It will be apparent to a person skilled in the art that as technology advances, the basic idea of the invention may be implemented in many different ways. The invention and its embodiments are thus not restricted to the examples described above but may vary within the scope of the claims.

In the present embodiment, the bevelled surface 33 extends from the operating position recess 32 to the maintenance position recess 34. This way, the bevelled surface 33 can be made as long as possible to ensure reliable operation of the mudguard fastening support even at large turning angles of the wheel. Also, the turning of the mudguard into its maintenance position can be done reliably and in a controlled manner. If desired, the bevelled surface 33 can also be made shorter, whereby there may be a horizontal section between the bevelled surface 33 and maintenance position recess 34.

The support surface 23 has at least one tip part 24. If there are at least two peak parts 24, weight can be distributed over more than one area and even symmetrically, if desired. There may also be three or even more tip parts 24.

The support surface 23 and mating surface 31 are preferably formed symmetrically, i.e. in a similar shape toward each turning direction. In such a case, the mating surface 31 has a bevelled surface 33 on both sides of the operating position recess 32, for instance. This way, the mudguard fastening support can be mounted either on the left side or the right side of the vehicle, i.e. the fastening support need not separately be made into a right-handed and left-handed one.

The invention claimed is:

1. A mudguard fastening support that is intended to connect the mudguard to a hub of a turning wheel, whereby at an angle that is smaller than a specific turning angle, the mudguard turns with the wheel, the mudguard fastening support having a flexible structure, a stop element preventing the mudguard from turning along with the wheel at an angle that is larger than the specific turning angle, and with the flexible structure the mudguard is returned to turn with the wheel at the angle that is smaller than said specific turning angle, the mudguard fastening support also having a turning sleeve to be fixed to the mudguard and a support element to be fixed to the hub of the turning wheel, the turning sleeve and support element having form surfaces facing each other, one of which forms a support surface and the other a mating surface, whereby the support surface has toward the mating surface a tip part having angular sides transitioning into a rounded peak, the tip part being of a uniform structure with the support element or the turning sleeve, and the mating surface has an operating position recess, which is furthest away from the support surface and to which at the angle that is smaller than the specific turning angle the tip part is arranged to be settled, and a bevelled surface adjacent to the operating position recess,
    wherein the support element has a cylindrical support pin and the turning sleeve has a cylindrical inner surface for settling against the support pin, and
    wherein the turning sleeve includes a flange portion extending away from the mating surface towards the support element such that the flange portion covers the mating surface and the support surface when the cylindrical support pin is received in the turning sleeve.

2. The fastening support as claimed in claim 1, wherein the radius of curvature of the tip part peak is more than 2 mm.

3. The fastening support as claimed in claim 1, wherein the shape of the operating position recess corresponds to that of the tip part peak.

4. The fastening support as claimed in claim 1, wherein a radius of curvature of the operating position recess is equal in size to that of the tip part peak of the support surface.

5. The fastening support as claimed in claim 1, wherein the tip part is formed of adjacent angular surfaces and a semi: cylindrical surface, and an imaginary line at an upper most portion of the rounded peak extending parallel to a centre axis of the semi-cylindrical surface runs through a centre axis of a support pin of the support element.

6. The fastening support as claimed in claim 1, wherein the support surface is formed by a base with a support wall on both sides of the tip part peak.

7. The fastening support as claimed in claim 1, wherein the bevelled surface has a specific mean wedge angle and the operating position recess has at a point adjacent to the bevelled surface a wedge angle larger than said mean wedge angle.

8. The fastening support as claimed in claim 1, wherein the mating surface has after the bevelled surface a maintenance position recess in the part of the mating surface that is closest to the support surface.

9. The fastening support as claimed in claim 8, wherein the shape of the maintenance position recess corresponds to that of the tip part peak.

10. The fastening support as claimed in claim 8, wherein the radius of curvature of the maintenance position recess is equal in size to that of the tip part peak.

11. The fastening support as claimed in claim 8, wherein the bevelled surface has a specific mean wedge angle and the bevelled surface has at its maintenance position recess end a wedge angle larger than said mean wedge angle.

12. The fastening support as claimed in claim 8, wherein the bevelled surface extends from the operating position recess to the maintenance position recess.

13. The fastening support as claimed in claim 1, wherein the inner surface is made of plastic.

14. The fastening support as claimed in claim 1, wherein the support surface is a form surface of the support element and the mating surface is a form surface of the turning sleeve.

15. The fastening support as claimed in claim 1, wherein the mating surface has an inner diameter that is larger than the diameter of the support pin.

16. A mudguard arrangement, wherein a mudguard is connected to a hub of a turning wheel by means of a mudguard fastening support whereby at an angle that is smaller than a specific turning angle, the mudguard turns with the wheel, the mudguard fastening support having a flexible structure, a stop element preventing the mudguard from turning along with the wheel at an angle that is larger than the specific turning angle, and with the flexible structure the mudguard is returned to turn with the wheel at the angle that is smaller than said specific turning angle, the mudguard fastening support also having a turning sleeve to be fixed to the mudguard and a support element to be fixed to the hub of the turning wheel, the turning sleeve and support element having form surfaces facing each other, one of which forms a support surface and the other a mating surface, whereby the support surface has toward the mating surface a tip part and the tip part is formed by a base with a support wall on both sides of a rounded peak, the tip part being of uniform structure with the support element or the turning sleeve, the mating surface has an operating position recess, which is furthest away from the support surface and to which at an angle that is smaller than the specific turning angle the tip part is arranged to be settled, and a bevelled surface adjacent to the operating position recess, and wherein the support element has a cylindrical support pin and the turning sleeve has a cylindrical inner surface for settling against the support pin, and wherein the turning sleeve includes a flange portion extending away from the mating surface towards the support element such that the flange portion covers the mating surface and the support surface when the cylindrical support pin is received in the turning sleeve.

17. The mudguard arrangement as claimed in claim 16, wherein the mating surface has an inner diameter that is larger than the diameter of the support pin.

18. A mudguard arrangement, wherein a mudguard is connected to a hub of a turning wheel by means of a mudguard fastening support whereby at an angle that is smaller than the specific turning angle, the mudguard turns with the wheel, the mudguard fastening support having a flexible structure, a stop element preventing the mudguard from turning along with the wheel at an angle that is larger than the specific turning angle, and with the flexible structure the mudguard is returned to turn with the wheel at the angle that is smaller than said specific turning angle, the mudguard fastening support also having a turning sleeve to be fixed to the mudguard and a support element to be fixed to the hub of the turning wheel, the turning sleeve and support element having form surfaces facing each other, one of which forms a support surface and the other a mating surface, whereby the support surface has toward the mating surface a tip part with a rounded peak and the mating surface has an operating position recess, which is furthest away from the support surface and to which at an angle that is smaller than the specific turning angle the tip part is arranged to be settled, and a bevelled surface adjacent to the operating position recess, wherein the tip part peak has angular side surfaces and a semi-cylindrical surface, wherein the support element has a cylindrical support pin and the turning sleeve has a cylindrical inner surface for settling against the support pin, and wherein the turning sleeve includes a flange portion extending away from the mating surface towards the support element such that the flange portion covers the mating surface and the support surface when the cylindrical support pin is received in the turning sleeve.

19. The mudguard arrangement as claimed in claim 18, wherein the mating surface has an inner diameter that is larger than the diameter of the support pin.

* * * * *